Figure 6:
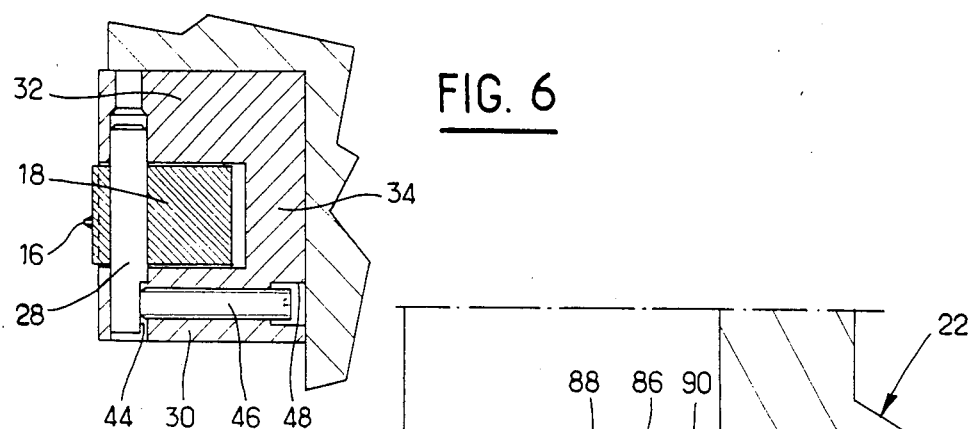

A
United States Patent [19]

Perraudin

[11] Patent Number: 4,706,483

[45] Date of Patent: Nov. 17, 1987

[54] METHOD AND DEVICE FOR FINISHING BY BURNISHING OF A HELICAL THREAD CUT ON A CYLINDRICAL COMPONENT

[75] Inventor: Hubert A. Perraudin, Champigny sur Marne, France

[73] Assignee: Equipements Automobiles Marchal, Issy-les-Moulineaux, France

[21] Appl. No.: 604,654

[22] Filed: Apr. 3, 1984

[30] Foreign Application Priority Data

Aug. 3, 1982 [FR] France ............................. 82 13574

[51] Int. Cl.⁴ .............................................. B21H 3/02
[52] U.S. Cl. ............................................ 72/84; 72/102
[58] Field of Search .................. 72/103, 104, 703, 80, 72/84, 102, 111; 29/90 R

[56] References Cited

U.S. PATENT DOCUMENTS

| | | | |
|---|---|---|---|
| 631,159 | 8/1899 | Echols | 72/104 |
| 1,365,386 | 1/1921 | Djidics | 72/104 |
| 1,878,117 | 9/1932 | Diescher et al. | 72/103 |
| 3,877,273 | 4/1975 | Culver | 72/102 |

FOREIGN PATENT DOCUMENTS

| | | | |
|---|---|---|---|
| 2036480 | 1/1972 | Fed. Rep. of Germany | 72/703 |
| 1524453 | 6/1968 | France . | |
| 349282 | 6/1953 | Switzerland . | |

OTHER PUBLICATIONS

Machinenmarkt Industrie Journal, vol. 77, No. 12, 1971 (Wuerzburg, DE), G. Felgentreu et al.: "Mikroverfeinerung durch Walzen", pp. 239 to 240, with English translation.

Soviet Engineering Research, vol. 2, No. 5, pp. 7–8, May 1982..

Primary Examiner—Lowell A. Larson
Attorney, Agent, or Firm—Brisebois & Kruger

[57] ABSTRACT

In accordance with the invention, a wheel (16) is used as the burnishing wheel for a helical thread, the periphery of which wheel has a profile whose shape matches that of the thread to be surfaced. The wheel (16) is mounted such that it rotates freely about an axis which is inclined with respect to the axis of the screw (10) which is caused to rotate about its own axis. The wheel (16) is applied in a resilient manner to the screw (10) by means of a compression spring (56) which pushes the pivoting support (18) of the wheel (16) in the direction of the screw (10). The carriage (20) on which the support (18) is pivotably mounted is freely displaceable in translation parallel to the axis of the screw (10) on a rail (22). The invention may be used for finishing by means of burnishing of a helical thread using an automatic repetitive cycle comprising a predetermined number of passes of a burnishing wheel along the thread.

10 Claims, 8 Drawing Figures

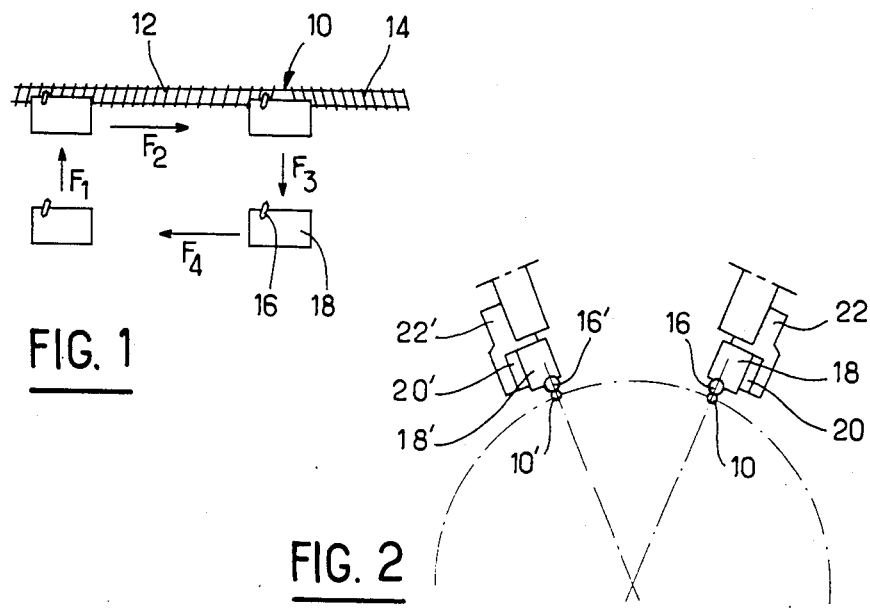
FIG. 1
FIG. 2
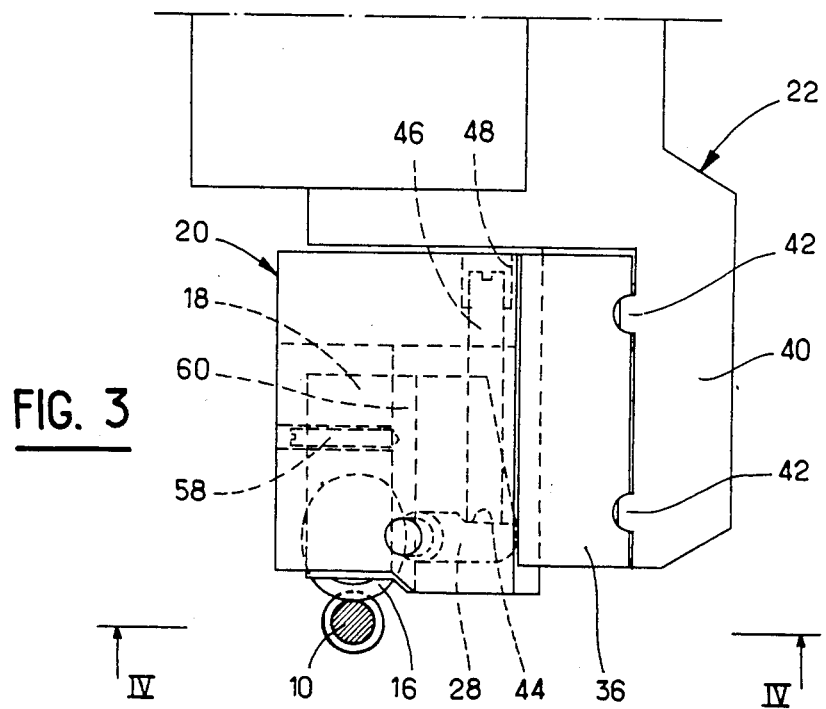
FIG. 3

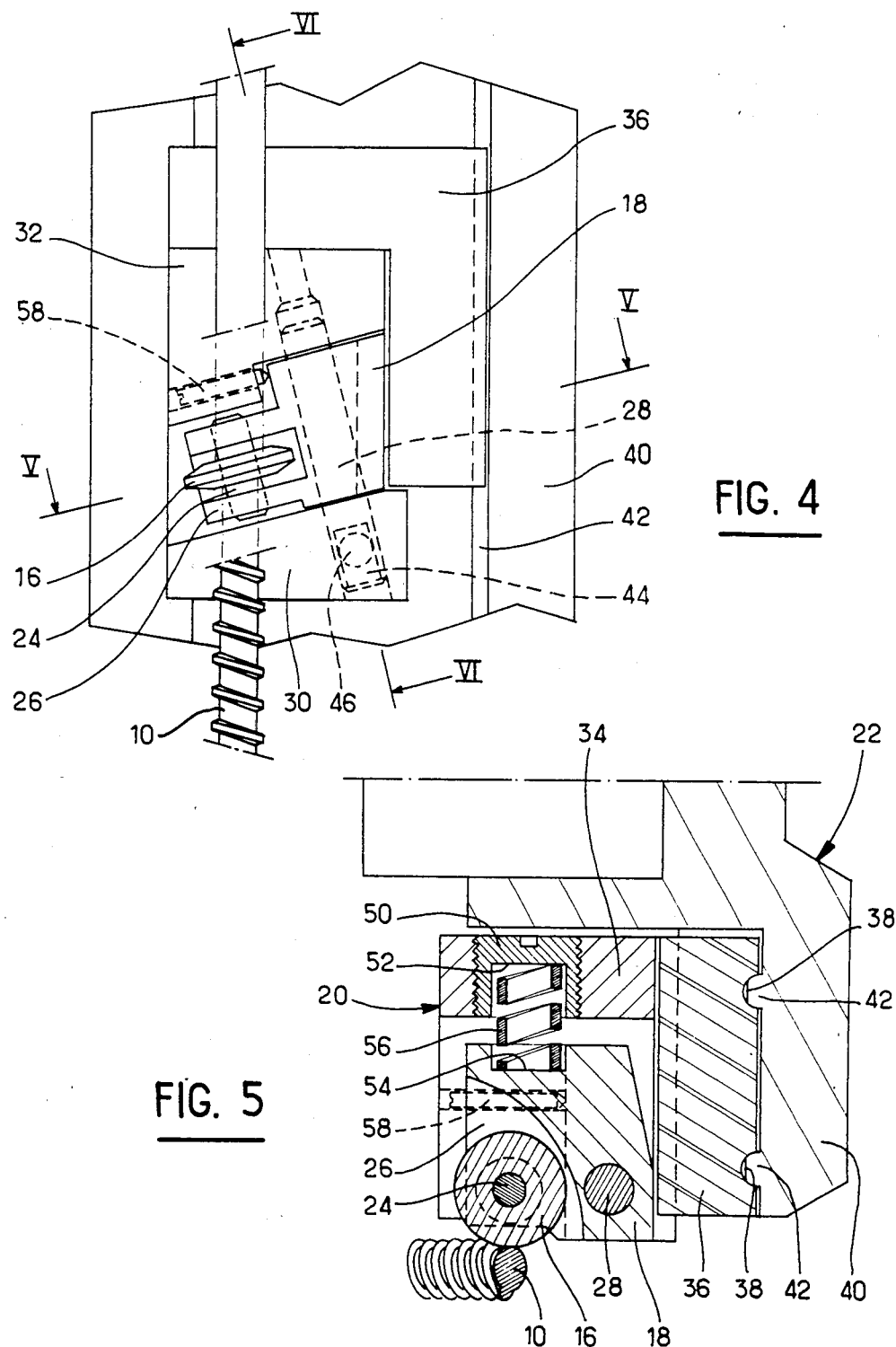

METHOD AND DEVICE FOR FINISHING BY BURNISHING OF A HELICAL THREAD CUT ON A CYLINDRICAL COMPONENT

The present invention relates to a method and a device for finishing by burnishing of a helical thread cut on a cylindrical component, and more particularly to a method and a device enabling the finishing of a helical worm gear screw having one or a plurality of threads.

The burnishing operation enables, in a general manner, an improvement of the surface condition of the components which are subjected thereto and an increase in the surface strength of the metal from which these components are made. In accordance with this technique, there is applied to a surface to be finished, at a relatively high pressure, a component having a portion with a profile which corresponds to or a shape which is complementary to the surface to be finished, and this portion having a corresponding profile is rolled and possibly pushed over the surface to be finished. Consequently, the surface defects resulting from machining are for the most part flattened out and the condition of the surface to be finished is considerably improved.

In the particular case of helical worm gear threads, the burnishing operation is carried out using burnishing wheels which have helical threads which match those whose surface condition is to be improved. In the prior art the rotation of the wheel(s), on one hand, and the component whose surface is to be finished, on the other hand, is carried out by one of the above elements, in general the burnishing wheel(s). The other element is caused to rotate by the meshing of the helical thread of the component and the portion with the corresponding profile of the wheel(s).

However, the entrainment of the helical thread to be surfaced by the burnishing wheels always involves a certain amount of slip which leads to a slight offset between the wheels and the thread to be surfaced, such that if there is a considerable time involving cooperation by rolling, a displacement of the component to be surfaced with respect to the wheels or a deformation of the components involved takes place. In addition, the burnishing causes a slight plastic deformation which can only increase the relative slip between the components involved. In order to avoid these drawbacks, the French patent application 80-06 582, in the name of the applicants, discloses a method of this type, in which the component to be finished is clamped between a burnishing wheel, comprising a helical thread which matches the thread of the component, and a counter-component, in which the component to be finished is caused to rotate synchronously with the burnishing wheel.

In the above application, at least one burnishing wheel is used advantageously as a counter-component, such that the component to be finished is clamped between several identical burnishing wheels distributed uniformly around the axis of the component to be finished, the axes of the said wheels being parallel to the axis of the component to be finished. The latter may be clamped between two burnishing wheels disposed on both sides of the component to be finished such that the axes of the two wheels and the axis of the component are coplanar, and the two burnishing wheels may be clamped against the component by a jack or by the closure, by means of a jack, of the two arms of a compass, the two wheels being disposed on the ends thereof.

Although the method and the machine for finishing by burnishing described in the above patent application produce a satisfactory result, as a result of the rotations which take place synchronously and the setting of the angular position between the component to be finished and the burnishing wheels, this method and this machine have the drawback that they are expensive and difficult to use. Each of the burnishing wheels used has the shape of a cylindrical roll which has, on its lateral surface which acts on the screw, a helical thread which matches the thread cut on the screw. Consequently, in order to obtain a suitable surface condition of the thread of the screw after the burnishing operation, the complementary threads of the cylindrical burnishing wheels must be machined with a high degree of precision, in the range of 2 microns. The formation of the burnishing wheels is therefore a difficult and costly operation. In addition, the machine structure must be rigid and of a relatively large size in order to support the hydraulic jack for clamping the burnishing wheels against the screw with a sufficient clamping force (approximately 500 N) or for closing the two arms of a compass on the ends of which the wheels are supported.

The object of the present invention is to set out a method and a device for finishing by means of burnishing which enables the achievement of results which are at least as satisfactory as those obtained with the method and the machine described in the French patent application 80-06 582, but which are simpler to use and far less costly.

The invention therefore relates to a method of finishing by means of burnishing of a helical thread cut on a cylindrical component, in particular a worm gear screw having one or more threads, in which there is inserted into the helical thread a correspondingly profiled portion of a burnishing wheel and in which the component and the wheel are clamped against one another, one of these members being rotated about its axis and causing the rotation of the other element about its own axis by cooperation of the helical thread and the corresponding profiled portion, and in which use is made, as the burnishing wheel, of a wheel whose periphery is provided, in section, with a profile corresponding to the helical thread, characterised in that the said wheel is mounted on a support such that it rotates freely about an axis which is inclined with respect to the axis of the component, in that the component is caused to rotate about its own axis, in that the burnishing wheel is applied against the component in a resilient manner at the location of a thread end, in that the support of wheel is displaced parallel to the axis of the component such that the periphery of the wheel caused to rotate by the component is displaced into the helical thread, in that the wheel is spaced from the component at the location of the other thread end, in that the wheel support is then possibly displaced in the direction opposite to the previous displacement in order to begin a further cycle of resilient application of the wheel against the component, of displacement and then spacing of the wheel and in that this cycle is repeated as many times as is necessary for the achievement of the desired finish.

The method of the invention is preferably designed to be used as an automatic repetitive cycle, comprising a predetermined number of passes of the burnishing wheel along the helical thread of the component caused to rotate. It may advantageously replace the method described in the French patent application 80-06 582, in which the burnishing is carried out by means of a single pass of the threaded component between at least two cylindrical burnishing wheels, at least one of which is rotated synchronously with the component, as the single burnishing wheel is far less costly to produce and takes up less space than the two cylindrical wheels. It is, in effect, possible to dispense with the device for the synchronized entrainment of a wheel and the component, and it is possible to replace the hydraulic jack and its supply and control circuit, which are the expensive and space-consuming components, by means for the resilient application of the burnishing wheel against the component which are formed, in a particularly advantageous embodiment, by a simple compression spring.

In accordance with the invention, the burnishing wheel may be mounted to rotate freely about an axis having a fixed orientation on the support or about an axis which may be orientated on the latter. In the latter case, the orientation of the axis of the burnishing wheel on the support may be looked after the resilient application of a peripheral profiled portion of the wheel into the helical thread of the component. However, it is also possible to enable the self-adjustment of the burnishing wheel at the base of the helical thread of the component by allowing the axis of the wheel to be freely orientated, within a clearance range which is predetermined, on the support, after the resilient application of a peripheral profiled portion of the wheel to the helical thread of the component and during the displacement of the wheel and its support parallel to the axis of the said component.

The invention also relates to a device for carrying out the method of finishing by means of burnishing of a helical thread cut on a cylindrical component, as described above. The device of the invention comprises a mechanism for holding the component and a burnishing wheel, part of whose peripheral profile corresponds to the thread of the component and is designed to be inserted into the latter, and is characterised in that the mechanism for holding the cylindrical component simultaneously causes the rotation of this component about its own axis, in that the burnishing element is a wheel whose periphery is provided, in section, with a profile corresponding to the helical thread, the said wheel being mounted in a freely rotatable manner on an axis and the axis of the burnishing wheel being inclined over the axis of the component and supported by a support which is stressed, in a direction which is substantially perpendicular to the axis of the component, by resilient means for applying the burnsihing wheel against the component, and in that the support is mounted movably on a carriage, in a plane perpendicular to the axis of the burnishing wheel, wherein the said carriage may be moved in translation parallel to the axis of the component.

In a first advantageous embodiment, the burnishing wheel support is mounted pivotably on the carriage about a shaft which is parallel to the axis of the burnishing wheel. The displacement of the wheel support with respect to the carriage, which is required in order to apply the wheel against the component, is then obtained by pivoting of the support stressed by the resilient means, which means may be constituted by at least one compression spring which bears, on one hand, against a threaded cap screwed into the carriage and, on the other hand, against the support. Very simple adjustment means, comprising, for example, an adjustment screw mounted on the carriage, the end of whose shaft bears against a flat portion machined in the support, enabling an action which opposes the moment exerted by the spring to be exerted on the support in order to lock the support in a position in which the burnishing wheel may engage in the helical thread of the component in a suitable manner, may be provided.

In a second advantageous embodiment, the wheel support is mounted such that it may slide in translation on the carriage, in a direction perpendicular to the axes of the burnishing wheel and the component. In this latter case, it is advantageous for the support to be mounted such that it slides in translation in a sleeve which is itself pivotably mounted in the carriage about an axis which is perpendicular to the axes of the component and the wheel, wherein a locking mechanism advantageously enables the sleeve to be locked in the required position with respect to the carriage, after the insertion of the wheel into the helical thread of the component. In this way, the position of the wheel is automatically adjusted with respect to the thread of the component at the time of its engagement in the thread and is then locked in this position.

Figure 7:
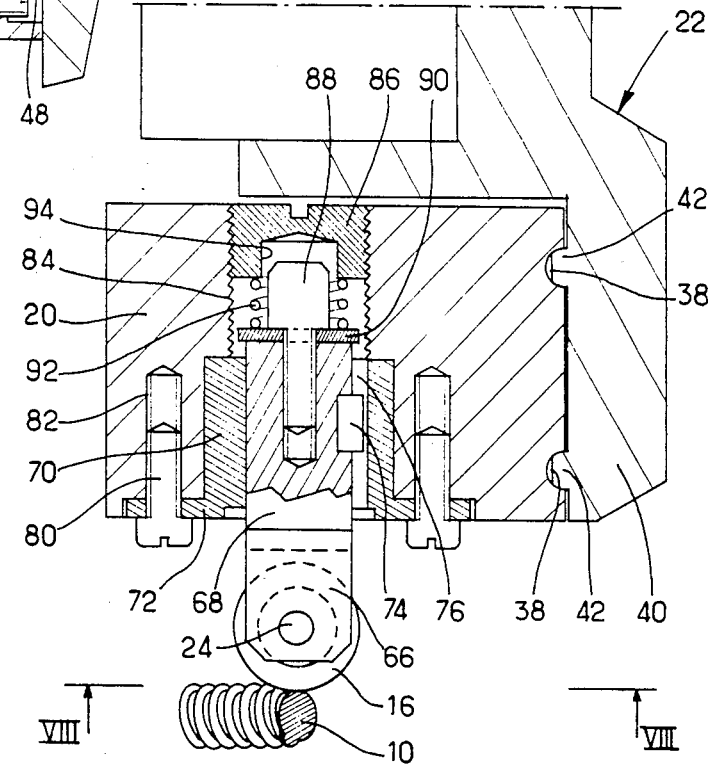
Figure 8:
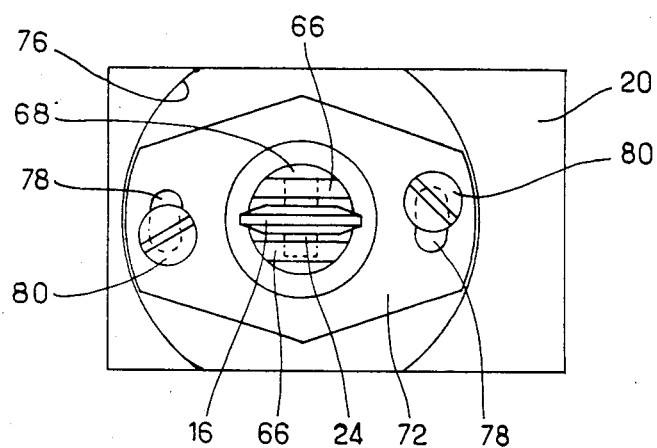

The invention is now described in detail, purely by way of non-limiting example, with respect to two embodiments thereof, with reference to the attached drawings, in which:

FIG. 1 is a diagrammatic view of an automatic repetitive burnishing cycle using a wheel which is mounted in a freely rotatable manner on a support which may be moved closer to and spaced from the threaded component to be finished in a direction which is substantially perpendicular to the axis of the latter, and which may also be displaced parallel to the axis of this component, in either direction, FIG. 2 is a diagrammatic end view of a device of the invention designed for the finishing of a worm gear screw having two threads having inverse pitches, FIG. 3 is an elevation, on an enlarged scale, of a portion of FIG. 2 relating to a first embodiment of the device of the invention, which view is perpendicular to the axis of the screw to be machined, FIG. 4 is a view from below along the line IV—IV of FIG. 3, FIG. 5 is a cross-section along the line V—V of FIG. 4, FIG. 6 is a partial cross-section along the line VI—VI of FIG. 4, FIG. 7 is a tranverse section through a second embodiment of the device of the invention, which section is perpendicular to the axis of the burnishing zone, and, FIG. 8 is a view from below along the line VIII—VIII of FIG. 7.

FIG. 1 shows a component to be surfaced which is a worm gear screw 10 around the left-hand end portion of which there has been cut a helical thread 12 having a pitch which faces in one direction, and on the right-hand end portion of the screw 10 there has been cut a helical thread 14 having a pitch facing in the other direction. This helical screw having two threads 12 and 14 has been cut from a cylindrical shaft of semi-killed steel, on the work station of a multispindle lathe. After cutting, the screw 10 is caused to rotate about its own longitudinal axis by one of the spindles on this lathe.

A burnishing wheel 16 is mounted on a support 18 such that it rotates freely about an axis which is inclined with respect to the longitudinal axis of the screw 10. The peripheral portion of the wheel 16 has a profile whose shape matches that of the threads 12 and 14.

From a rest position, shown at the foot of the left-hand side of FIG. 1, and in which the support 18 and the wheel 16 are spaced from the screw 10, the support 18 is displaced with respect to a carriage (not shown in FIG. 1 but which is, for example, the carriage of the lathe) towards the screw 10 in a direction which is substantially perpendicular to the axis of the latter until the wheel 16 is applied against the screw 10 at the beginning of the thread 12. The carriage is mounted such that it slides in translation on a rail (not shown) parallel to the axis of the screw 10. The support 18 is, in the first instance, displaced towards the screw 10 in the direction of the arrow $F_1$, and the wheel 16 is applied in a resilient manner against the said screw 10 by resilient means which bear, on one hand, against the carriage and, on the other hand, against the support 18. These resilient means ensure that the peripheral portion of the wheel 16 penetrate into the thread 12 of the screw 10 and that the wheel 16 bears against the base of the thread with a predetermined force, for example 300 N, determined by the calibration of the resilient means.

As a result of the fact that the screw 10 is caused to rotate about itself as soon as the wheel 16 contacts the screw 10, the wheel 16 is also caused to rotate about its own axis, and finishes, by means of burnishing, the surface of the thread 12 by rolling on the latter. The support 18 and the carriage which supports it are simultaneously displaced in translation parallel to the axis of the screw 10 up to the end of the thread 12 in the direction of the arrow $F_2$. The support 18 and the wheel 16 are then moved away from the screw 10 by a displacement of the support 18 with respect to the carriage which takes place substantially in a direction perpendicular to the axis of the screw 10 in the direction of the arrow $F_3$. This operation for removing the wheel 16, at the end of a burnishing operation, is followed by a translation of the carriage parallel to the axis of the screw 10 in the direction of the arrow $F_4$, in the direction opposite to the previous translation of the carriage in order to return the wheel 16 and the support 18 to the initial position so that a further burnishing operation may be commenced.

The thread 12 is provided with an excellent finish by burnishing at the end of the eleven seconds duration of an automatic cycle of 20 passes of the wheel 16 along the thread 12, with a force of application of the wheel 16 on the base of the thread of approximately 300 N.

FIG. 2 shows at 10' the position occupied by the screw 10 after finishing by means of burnishing of the thread 12 at the time when the thread 14 is to be finished by burnishing. Transfer from one position to the other takes place by displacing the screw 10 parallel to itself along a circular arc, and the thread 14 is then surfaced by means of a second assembly constituted by a second burnishing wheel 16', a second support 18' and a second carriage 20' mounted in a similar manner, but symmetrical to the first assembly described above and operating in the same way.

In the first embodiment shown in FIGS. 3 to 6, the burnishing device comprises a wheel 16 whose peripheral portion has a profile whose shape matches the thread of the screw 10. This wheel is mounted such that it may rotate freely about its axis on a pivot 24. The pivot 24 is housed in two bores disposed one as an extension of the other and each drilled in one of the two lugs 26 of a lateral cap of a support 18. The latter is itself mounted pivotably on a shaft 28 which is parallel to the pivot 24 and housed in a bore whose axis is inclined with respect to the axis of the screw 10. The said bore is drilled in the front and rear portions 30 and 32 of a carriage member 20, wherein the said portions 20 and 32 are connected by an upper portion 34. The carriage member 20 which therefore has the form of a cap, between the two portions 30 and 32 of which the support 18 may pivot, is rigid with a sliding plate 36 having a right-angled shape. One arm of the plate 36 is orientated in a direction which is substantially parallel to the axis of the screw 10 and has two grooves 38 which are parallel to one another and to the axis of the screw 10. Each of these grooves 38 houses a slide rail 42 which projects with respect to the opposite face of one arm 40 of the rail 22 which has a right-angled section. The carriage 20 which has a substantially parallelepipedic general external shape may slide parallel to the axis of the screw 10 in the angle of the rail 22 and bears on the slide rails 42.

The shaft 28 is locked in a suitable position in its bore by the bearing against a flat portion 44 machined in that of the ends of the shaft 28 which is housed in the front portion 30 of the carriage member 20, of the end of the shaft of a locking screw 46. The shaft 46 is screwed into a tapped bore having its axis substantially perpendicular to the axis of the shaft 28, the said bore being drilled in the front portion 30 of the member and communicating with the housing of the shaft 28, as is clearly shown in FIG. 6. The head of the screw 46 is disposed in a forward hole 48 of the carriage member 20.

A threaded stopper 50 is screwed into a tapped bore drilled in the upper portion 34 of the carriage member 20. This bore emerges above the pivoting support 18. The stopper 50 has a recess 52 which opens towards the support 18 opposite a recess 54 provided in the upper face of the support. A compression spring 56 bears, by means of its upper end housed in the recess 52 against the carriage member 20 and by means of its lower end housed in the recess 54 against the support 18. The support 18 is therefore forced back in the direction of the screw 10 such that the burnishing wheel 16 is resiliently applied with its thread base against the screw 10 with a force of approximately 300 N which is directed substantially perpendicularly with respect to the axes of the screw 10 and the pivot 24, wherein the said force does not pass through the axis of the shaft 28 but is offset laterally with respect to the latter so as to exert a pivoting moment in the required direction on the support 18. The position of maximum pivot of the support 18 may be adjusted by acting on an adjustment screw 58 screwed into a tapped bore having an axis substantially perpendicular to the axis of the pivot 24, the said bore being drilled in the rear portion 32 of the carriage member 20. The end of the shaft of the adjustment screw 58 bears against a plane surface 60 machined on the support 18 such that, as a result of the action on the screw 58, it is possible to exert a moment which opposes that exerted by the spring 56 on the support 18.

In the second embodiment shown in FIGS. 7 and 8, use is made of a burnishing wheel 16 mounted such that it rotates freely about its axis on a pivot 24 and a carriage member 20 which is, in this embodiment, a solid element of parallelepipedic shape which is slidably mounted in the angle of a right-angled rail 22, by means of the grooves 38 of the carriage member 20 and the slide rails 42 of the arm 40 of the rail 22, as described above with respect to the first embodiment.

However, in this second embodiment, the pivot 24 is mounted between the two lugs 66 of a cap supported at the lower end of a support 68 which has the shape of a cylindrical core mounted in an axially slidable manner in a sleeve 70 having a collar 72. The support 68 and the sleeve 70 are components which are coaxially rigid in rotation by means of a key 74 mounted in the support 68 and sliding in a groove 76 of the sleeve 70. The sleeve 70 is itself pivotably mounted in a coaxial bore of the carriage member 20. The collar 72 which is rigid with the lower portion of the sleeve 70 is housed in a further coaxial bore 76 which is not very deep of the member 20. The collar pivots in this bore 76 simultaneously with the sleeve 70. This pivoting action is facilitated by the shape of the collar 72 which is hexagonal, two sides of the hexagon opposite one another being rounded into a radius of curvature which is slightly less than the radius of the bore 76 as is clearly shown in FIG. 8.

Two kidney-shaped slots 78 are drilled in the collar 72 and are traversed by the shafts of locking screws 80 screwed into the tapped bores 82 of the member 20. The heads of the screws 80 may therefore clamp the collar 72 against the member 20 and lock the collar 72 and the sleeve 70, and therefore also the support 68, in any desired angular position with respect to the member 20 which is enabled by the angular aperture of the slots 78. This enables a range of pitches for the threads to be surfaced to be used. The bore in which the sleeve 70 is housed is extended by a forward hole 84 having a diameter which is smaller than the external diameter of the sleeve 70 and greater than the diameter of the cylindrical support 68. This forward hole 84 which communicates with the upper face of the member 20 has its portion adjacent to this upper face tapped, and a threaded stopper 86 is screwed therein. A large-headed screw 88 is screwed into the upper end of the support 68 and clamps a washer 90 against the upper face of the support, the external diameter of this washer being greater than that of the support 68 but lower than that of the bore 84. A compression spring 92 bears by means of its lower end on the washer 90 and by means of its upper end on the stopper 86. The stopper 86 comprises a recess 94 which is open in the direction of the head 88 of the screw. This head constitutes a centering element for the spring 92 and may be housed in a recess 94 such that the head 88 also constitutes an upper stop limiting the compression of the spring 92 and the sliding of the support 68 towards the interior of the carriage member 20 when it comes into contact with the base of the recess 94. The peripheral portion of the washer 90, which projects radially with respect to the support 68, constitutes a lower stop limiting the extension of the spring 92 and the sliding of the support 68 towards the exterior of the member 20 when it comes into contact with the upper end of the sleeve 70.

The support 68 is therefore mounted so that it slides in translation on the carriage 20, in a direction perpendicular to the axes of the burnishing wheel 16 and the screw 10. The sleeve 70, in which the support 68 is slidably mounted is itself pivotably mounted in the carriage about an axis perpendicular to the axes of the screw 10 and the wheel 16.

The compression spring 92 therefore ensures that the support 68 is urged in the direction of the screw 10 and that the burnishing wheel 16 is resiliently applied against the screw 10 with a predetermiend force. As the locking screws 80 are slightly slack initially, the sleeve 70 and the support 68 may pivot. The force of the spring 92 therefore ensures that the wheel 16 penetrates into the base of the thread of the screw 10, even if the wheel 16 is not initially inclined in a suitable manner with respect to the axis of the screw 10. The wheel 16, which is therefore mounted on an axis which may be orientated on the carriage 20 is automatically adjusted to a correct angular position. The tightening of the screws 80 then ensures that the wheel 16 is locked in this angular position which is suitable for the thread in question. It is of course possible to pivot the support through an angle which is suitably calculated such that the orientation of the wheel 16 is provided before the wheel comes into contact with the screw threads.

In a further embodiment, it would be possible to envisage allowing the axis of wheel 16 to orientate itself freely on the support 68, in a predetermined range of clearance, after the resilient application of the the wheel 16 to the helical thread of the screw 10 and during the displacement of the carriage 20 parallel to the axis of this screw 10, such that the wheel 16 is constantly in a self-aligned position with respect to the portion of the thread on which it is displaced.

It is clear that the second embodiment of the device described above may be used in the manner described with reference to FIGS. 1 and 2.

The burnishing devices of the invention have a number of advantages with respect to those disclosed in the French Patent Application No. 80-06 582. In particular, whereas a cylindrical wheel in accordance with the prior art must be accurate to 2 microns in the case of screw surfaces to provide suitable results, the accuracy required for a burnishing wheel 16 is of the same order of magnitude but on a cylindrical surface. In addition, a wheel is far smaller than a cylindrical roller wheel and the bearing pressure of a wheel 16 used in accordance with this method is much smaller than for a cylindrical roller wheel. Consequently the device of the invention is far less costly than the prior device.

As a result of the spring which applies the wheel against the screw in a resilient manner, the device of the invention operates correctly even if the thread of the screw is relatively badly cut as a result of the incorrect operation of a previous step, in particular. This device therefore also enables possible defects in accuracy of the machine to be taken into account.

The structure of the burnishing device is much lighter and smaller when, in accordance with the invention, it comprises a spring instead of a hydraulic jack, as is the case in the above- mentioned application and, finally, it can be seen that the machining time is no longer than if a device of the type disclosed in the above-mentioned application were used.

It is obvious that the devices and the method described above may be modified in any desirable manner without departing from the scope of the invention.

I claim:

1. A method of finishing by burnishing, a helical thread (12,14) cut on a cylindrical component (10), in which a portion of corresponding profile of a burnishing wheel (16) is inserted into the helical thread (12,14), and the component (10) and the wheel (16) are clamped together, wherein one of the above components is caused to rotate about its own axis and causes the other component to rotate about its own axis by means of the engagement of the helical thread (12,14) and the corresponding profiled portion, said method comprising providing a burnishing wheel (16) whose periphery is provided, in section, with a single profile corresponding to the shape of the groove between adjacent thread crests, the wheel (16) is mounted such that it rotates freely on a support (18,68) about an axis which is inclined with respect to the axis of the component (10), the component (10) is caused to rotate about its own axis, the wheel (16) is resiliently pressed against a first end of the component (10), the support (18,68) of the wheel (16) is displaced parallel to the axis of the component (10) such that the periphery of the wheel (16) is caused to rotate by the component (10) and is displaced along the groove of the helical thread (12,14) by the component the wheel (16) is spaced from the component (10) at the other end of the thread (12,14) the support (18,68) of the wheel is then displaced to return the wheel to the first end to begin a new cycle of resilient application of the wheel (16) against the component (10), and displacement, and the cycle is repeated at least several times to obtain the required finish.

2. A method as claimed in claim 1, characterised in that the wheel (16) is mounted such that it rotates freely about an axis having a fixed orientation on the support (18).

3. A method as claimed in claim 1, characterised in that the wheel (16) is mounted such that it rotates freely about an axis which may be orientated on the support (68).

4. A method as claimed in claim 3, characterised in that the orientation of the axis on the support (68) is locked after the resilient application of a portion of the peripheral profile of the wheel (16) to the helical thread (12, 14) of the component (10).

5. A method as claimed in claim 3, characterised in that the axis of the wheel (16) may be freely orientated in a predetermined range of clearance on the support (68), after the resilient application of a portion of the peripheral profile of the wheel (16) to the helical thread (12, 14) of the component (10) and, during the displacement of the wheel (16), parallel to the axis of the said component (10).

6. A device for finishing by means of burnishing of a helical thread (12, 14) cut on a cylindrical component (10), for carrying out the method of claim 12 comprising a mechanism for holding the component (10) and a burnishing wheel (16), a portion of whose peripheral profile corresponds to the thread (12, 14) of the component (10) and is designed to be inserted in the latter, characterised in that the mechanism for holding the cylindrical component (10) simultaneously causes the rotation of the said component about its own axis, in that the burnishing wheel (16) is a wheel whose periphery is provided, in section, with a profile corresponding to the helical thread (12, 14), the said wheel being mounted such that it rotates freely about an axis (24), the axis (24) of the burnishing wheel (16) being inclined with respect to the axis of the component (10) and supported by a support (18,68) which is stressed in a direction which is substantially perpendicular to the axis of the component (10) by resilient means (56, 92) for applying the burnishing wheel (16) to the component (10), in that the support (18, 68) is mounted movably on a carriage (20) in a plane perpendicular to the axis of the burnishing wheel (16), the said carriage (20) being movable in translation parallel to the axis of the component (10).

7. A device as claimed in claim 6, characterised in that the resilient means for applying the burnishing wheel (16) against the component (10) comprise at least one compression spring (56, 92) one end of which bears against acap (50, 86) fixed on the carriage (20) and the other end of which bears against the support (18, 68).

8. A device as claimed in claim 6, characterised in that the support (18) is mounted pivotably on the carriage (10) about a shaft (28) which is parallel to the axis (24) of the burnishing wheel (16).

9. A device as claimed in claim 6, characterised in that the support (86) is mounted slidably in translation on the carriage (20) in a direction which is substantially parallel to the axes of the burnishing wheel (16) and the component (10).

10. A device as claimed in claim 9, characterised in that the support (68) is mounted slidably in translation in a sleeve (70) which is pivotably mounted in the carriage (20) about an axis which is perpendicular to the axes of the component (10) and the wheel (16), a locking mechanism (72, 78, 80, 82) enabling the sleeve (70) to be locked with respect to the carriage (20).

* * * * *